(12) United States Patent
Salim

(10) Patent No.: US 12,089,582 B2
(45) Date of Patent: Sep. 17, 2024

(54) DEVICE FOR TRAPPING SMALL INSECTS AND MITES

(71) Applicant: Kenrico LTD., Shimada (JP)

(72) Inventor: Nurman Salim, Shimada (JP)

(73) Assignee: Kenrico LTD., Shimada (JP)

( * ) Notice: Subject to any disclaimer, the term of this patent is extended or adjusted under 35 U.S.C. 154(b) by 53 days.

(21) Appl. No.: 17/972,882

(22) Filed: Oct. 25, 2022

(65) Prior Publication Data

US 2024/0107992 A1 Apr. 4, 2024

(30) Foreign Application Priority Data

Oct. 4, 2022 (DE) ............... 20 2022 105 612.9

(51) Int. Cl.
| | |
|---|---|
| *A01M 1/14* | (2006.01) |
| *B32B 3/04* | (2006.01) |
| *B32B 3/12* | (2006.01) |
| *B32B 5/02* | (2006.01) |

(52) U.S. Cl.
CPC ............. *A01M 1/14* (2013.01); *B32B 3/04* (2013.01); *B32B 3/12* (2013.01); *B32B 5/022* (2013.01); *B32B 2250/40* (2013.01); *B32B 2307/21* (2013.01); *B32B 2307/402* (2013.01); *B32B 2405/00* (2013.01)

(58) Field of Classification Search
CPC ... A01M 1/14; B32B 3/04; B32B 3/12; B32B 5/022; B32B 2250/40; B32B 2307/21; B32B 2307/402; B32B 2405/00
See application file for complete search history.

(56) References Cited

U.S. PATENT DOCUMENTS

| | | | | |
|---|---|---|---|---|
| 6,199,315 | B1 * | 3/2001 | Suzue ................ | A01M 1/14 43/113 |
| 2011/0302821 | A1 * | 12/2011 | Casagrande ......... | A01M 1/103 43/58 |

FOREIGN PATENT DOCUMENTS

| | | | | |
|---|---|---|---|---|
| CN | 115005177 A | * | 9/2022 | |
| DE | 102009043826 B4 | * | 5/2013 | ............. A01M 1/02 |
| KR | 101478671 B1 | * | 1/2015 | |

* cited by examiner

*Primary Examiner* — Richard G Davis
(74) *Attorney, Agent, or Firm* — Collard & Roe, P.C.; William Collard

(57) ABSTRACT

There is a device for trapping insects and mites, comprising at least one patch having a honeycomb structure and being of an antistatic material and a glue disposed at least within holes of the honeycomb structure. In one embodiment, the honeycomb structure has holes having a diameter of less than 2 millimeters. In at least one embodiment, the antistatic material mainly is based on a non-woven polymer material. In at least one embodiment, the device includes an attractant including a sachet.

7 Claims, 1 Drawing Sheet

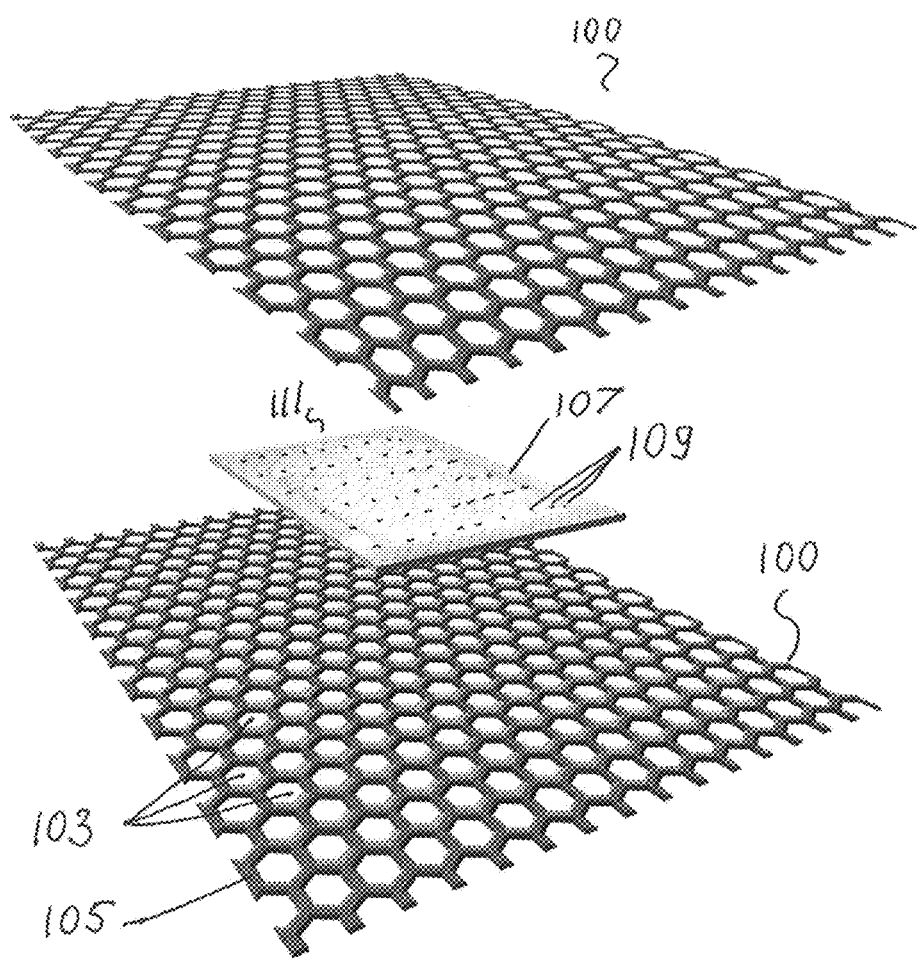

DEVICE FOR TRAPPING SMALL INSECTS AND MITES

CROSS REFERENCE TO RELATED APPLICATIONS

This application claims priority under 35 U.S.C. § 119 of German Application No. 20 2022 105 612.9, filed on Oct. 4, 2022, the disclosure of which is incorporated by reference.

FIELD OF THE INVENTION

The present invention generally relates to insects' and mites' traps. More particularly, the invention relates to a device that traps tiny insects and mites using scented patches or scented fibers and glue.

BACKGROUND OF THE INVENTION

In 1961, Maw discovered that although insects are attracted to a light source, they are relucted to enter the field the stronger the electric charge around the light source is. In 2011, Christopher Jackson and colleagues at Southampton University showed that the cockroaches turned away, or were repulsed, when they encountered an electric field and if continuously exposed to one, walked more slowly, turned more often and covered less distance.

Some electricity free pests' traps are based on formalin, which is an aqueous formaldehyde solution. However, the use of pesticides such as formalin for bug repellent devices shall be avoided. Other electricity free traps commonly used are based on tapes with glue for trapping insects and mites. Some of them include ingredients such as pesticides.

In view of the foregoing, there is a need for improved techniques for use in trapping small insects and mites based on natural contents.

SUMMARY OF THE INVENTION

Disclosed herein is a device for trapping insects and mites, i.e. an insects' and/or mites' trapping device, comprising one or more patches having a honeycomb structure and being of an antistatic material, wherein a glue is provided at least within holes of the honeycomb structure. This specific structure allows trapping small insects and/or mites at the surface or in the holes of the honeycomb structure of the patches. Insects or mites can be attracted to the small holes of the honeycomb structured patches and can be trapped due to the adhesive effect of the glue provided at these parts of the patches.

Moreover, these devices can be used in a method for trapping insects and mites, comprising the step of placing one or more devices on the floor. Of course, the device can also be used for other pests which do not belong to insects and mites. In another variation, they can be used in the form of hangers or stickers, for example. Thus, they can be placed in a room or at a wall or window of a room or furniture. The use of a honeycomb structure together with the antistatic materials allows an improved trapping technique for trapping small insects and mites based on natural contents.

BRIEF DESCRIPTION OF THE DRAWINGS

The present invention is illustrated by way of example, and not by way of limitation, in the accompanying FIGURE in which like reference numerals refer to similar elements and in which:

The FIG. 1 illustrates an exemplary embodiment of a trapping device as described herein.

Unless otherwise indicated illustrations in the FIGURE are not necessarily drawn to scale.

DESCRIPTION OF THE PREFERRED EMBODIMENTS

The present invention is best understood by reference to the detailed FIG. 1 and description set forth herein. However, those skilled in the art will readily appreciate that the detailed description given herein with respect to the FIG. 1 is for explanatory purposes as the invention extends beyond these limited embodiments. For example, it should be appreciated that those skilled in the art will, in light of the herein described teachings, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the described technology that are too numerous to be listed but that all fit within the scope of the disclosure. Also, singular words should be read as plural and vice versa and masculine as feminine and vice versa, where appropriate, and alternative embodiments do not necessarily imply that the two are mutually exclusive.

The device for trapping insects and/or mites may comprise one or more, that means two, three, four or even more, patches. Each patch may have a honeycomb structured surface. Honeycomb means in this regard that the surface has holes or through holes, at least some of them or all are in a form of a honeycomb. The honeycombed structured holes are surrounded by a wall made of an antistatic material. The diameter between opposite holes may be less than 2 millimeters, preferably less than 1 millimeter. Smaller holes may be preferred to attract smaller insects or mites or other pests. Larger holes may be used to attract larger insects or mites to trap them therein.

The honeycomb patch may have dimensions that they can be easily placed in the household without being predominantly visible. Therefore, exemplified honeycomb patches preferably have a width of 95 mm and a length of 125 mm. However, honeycomb patches in alternate embodiments may have various shapes and sizes. Therefore, they can easily be placed in the house everywhere.

At least the diameter of the holes shall be adjusted such that the mites or insects may be trapped in the holes or may at least partly intrude into the holes and not only being trapped at the upper surface of the patches. If there is at least a partly intrusion of the insects or mites into the holes, the glue provided therein may trap the insects or mites better than if they stick to the surface only. Usually, the insects or mites attracted will try to move and will be trapped at more sites inside the holes so that it is unlikely that they can escape.

In some embodiments, the holes in the form of a honeycomb structure are suitable for mimicking nests, whereby the small insects and mites can be attracted and trapped. Therefore, the honeycomb structure may improve the attractivity of the device for trapping insects and mites by using natural instincts of the insects and/or mites. It is assumed that concaved holes such as the honeycomb holes of the device according to the embodiments described herein mimic insect nests. Mites or ticks or insects generally like to climb into small openings to search for food, protect themselves against predators, and lay their eggs therein. Therefore, the honeycomb holes improve the attracting of the insects and mites so that the trapping rate may be increased.

In some embodiments, the antistatic material is mainly based on a non-woven polymer material. Examples are polyethylene-based materials. Mainly based on does mean that 50% or more of the material consist of non-woven polymer material. If a non-antistatic material is used, it is possible to use an antistatic coating on the material to provide the antistatic effect.

The patches may be formed from fibers which are laid in the form of the honeycomb structure thus forming a network of one or more fibers. A method for forming the honeycomb structured holes may use placeholders around which fibers are placed. Several fibers at one side of the placeholder may form walls between the holes after replacing the placeholders.

Some examples of the device further comprise an attractant included in a sachet. Preferably, the attractant included in the sachet is provided at parts of a backside of the patch. Backside means the side of the device used for attaching the device on the floor. The backside generally is opposite to the frontside which is the side with the holes. If through holes are provided in one patch, for example, the frontside and the backside may have holes. If one patch is used, this is the preferred constitution. It may be useful to place the sachet in the middle of the patch so that it can be sticked with the backside of the patch on the floor. In this case the sachet is placed directly on the floor and it is fixed with the surrounding patch sides. Alternatively, the device may comprise more than one patch such that the device comprises an attractant included in a sachet provided between two patches. In this embodiment, the glue may be provided at the backside of the device in order to place it on the floor without the need for additional sticking means.

Exemplified attractants may be natural ingredients having a specific scent which attracts the insects and mites to the device. Natural ingredients may be used in granule forms and may be sealed inside a sachet. The sachet made with rayon may have a bag opening into which the natural ingredients such as, but not limited to, flour and dextrin may be inserted. In some embodiments, the bag section of the sachet may be large and can be made to contain up to 15 grams, for example, one to eight grams, preferably five to eight grams of ingredients. Those skilled in the art, in light of the present teachings, will readily recognize that various other types of ingredients and amounts of ingredients may be used in alternate embodiments.

In some embodiments, the device may be made of a material having a color within the visible spectrum of the insects or mites to be trapped. The device may, for example, be green colored. At least the patches may be green colored because most of the harmful insets have a visible color spectrum comprising green. Combinations in the ultraviolet color spectrum or with green and yellow or the use of green or yellow as the sole color may be useful for different kind of mites and insects.

According to some examples, the device may comprise patches having a sticking surface at their backside protected by a cover layer. The backside is the side onto which the device is placed on the floor, for example. The sticking surface may be provided by the glue used in the holes of the patches for example. Additional glue compositions may be used as well for covering the patch surfaces, in particular the backside of the device which is used for placing the device on the floor. The cover protects the device from being sticked to the packaging before use of the device and will be removed when using the device.

The device may be used in a method for trapping insects and mites. In some examples the method may comprise a step of placing one or more devices on the floor. Alternative uses may comprise the step of hanging or sticking one or more patches according to any of the preceding embodiments in a room or at a wall or window of a room or furniture.

The device according to the above-described embodiments preferably may eliminate any electrical field with antistatic property, may be harmless by using formalin-free glue, and may improve attracting insects and mites by mimicking the shape of their nests and by using ultraviolet color spectrums visible to their eyes.

In one embodiment, a honeycomb trapping device for trapping small insects and mites is presented. The honeycomb trapping device includes a white patch sandwiched between two honeycomb layers. The honeycomb layers may be colored with 300-650 nm color spectrums and filled with formalin-free glue. The white patch may include a non-woven rayon surface optionally made antistatic by a polyethylene covering. The rayon surface may include a plurality of openings for emitting scent. A mixture of natural ingredients including flour and dextrin may be provided in the sachet as attractant. The mixture is formulated to emit scent to attract small insects and mites.

In another embodiment, a honeycomb patch for trapping small insects and mites is presented. The honeycomb patch includes means for emitting scents, means for enhancing visibility, and means for mimicking nests, whereby the small insects and mites can be attracted and trapped.

Preferred embodiments of the present invention provide a honeycomb patch that is used to trap small insects and mites using formulated ingredients to emit scent. In a preferred embodiment, a honeycomb patch comprises formulated ingredients. The patch is put anywhere inside the house. In preferred embodiments, the patch is easy to use and works for 3 months of time.

The FIG. 1 illustrates an exemplary trapping device in an exploded view. The device comprises two honeycomb patches 100, one at the frontside and one at the backside. In this case, both sides are provided with glue at the surface of the patches 100. Thus, it is not decisive which side is used for sticking the device on the floor. In other embodiments, it is possible that only one side is provided with glue at the surface of the patch 100 so that it can be used to fix it on the floor. This is then the backside. At the frontside, the glue may be placed inside the holes 103 of the patch 100 so that it is not sticky at the surface of the frontside of the device. The honeycomb patches 100 are made from polyethylene coated with antistatic property and ultraviolet color spectrums. The patches 100 comprise holes 103 surrounded by honeycomb shaped walls 105. The white sachet 111 is made from non-woven rayon 107 coated with antistatic property. The rayon 107 comprises openings 109 that offer enhanced scent emittance. The honeycomb patches 100 of this example have a width of 95 mm and a length of 125 mm. The honeycomb patches 100 have a large surface area so that it can trap more small insects and mites. The weight of the white sachet 111 is preferably four grams with an error level of 0.2 grams.

In the present embodiment, scents in granule forms are sealed inside the white sachet 111. The white sachet 111 is made with rayon 107 that has a bag opening into which the natural ingredients such as, but not limited to, flour and dextrin may be inserted. In the present embodiment, the bag section of the sachet is large and can be made to contain one to eight grams of ingredients.

In typical uses of the present embodiment, the device with the honeycomb structured patches 100 is placed anywhere on a dry surface of the household. Typically, the user uses the device with honeycomb patches 100 for three months. In the present embodiment, honeycomb patch 100 fits virtually any place of the house, is easy to use, and generally eliminates the need for dangerous insecticides. Honeycomb patches 100 are made of non-toxic, non-formaldehyde, non-allergic material and latex-free and may therefore be used from people who have allergies.

Testing has shown that honeycomb patches according to embodiments of the present invention may be used to trap tiny insects and mites. Furthermore, identification of small insects and mites from microscope by Doctor of Philosophy (PhD) in Zoology and Master of Science in Entomology at Stellenbosch University, South Africa, Nanika Esterhuizen, found that the honeycomb patches trapped harmful insects and mites such as *Liposcelis bostrychophila* that transmit diseases in humans, *Clogmia albipunctata* that cause the development of human diseases of nasopharyngeal, intestinal, and urinary myiasis, *Tetranychus urticae* or spider mites that cause yellowing, curling, and witting leaves, *Oligonychus ilicis* that are considered pests for plants as they feed on young leaves, *Liposcelis bostrychophila* or *Stegobium paniceum* that are considered pests for orchards and storage books as they feed on paper and adhesives.

The invention claimed is:

1. A device for trapping insects and mites, comprising:
   at least one patch having a honeycomb structure and being of an antistatic material; and
   a glue disposed at least within holes of the honeycomb structure; and
   an attractant included in a sachet, wherein the sachet is provided at parts of a backside of the patch.

2. The device according to claim 1, wherein the honeycomb structure has holes having a diameter of less than 2 millimeters.

3. The device according to claim 1, wherein the antistatic material mainly is based on a non-woven polymer material.

4. The device according to claim 1 wherein the sachet is provided between two patches.

5. The device according to claim 1, wherein the patches are made of a material having a color within the visible spectrum of the insects or mites to be trapped.

6. The device according to claim 1, wherein the patches have a sticking surface at their backside protected by a cover layer.

7. A method for trapping insects and mites, comprising the step of placing one or more devices according to claim 1 on the floor.

* * * * *